United States Patent [19]

Barton et al.

[11] Patent Number: 4,847,691
[45] Date of Patent: Jul. 11, 1989

[54] PROCESSING OF VIDEO IMAGE SIGNALS

[75] Inventors: Nicholas Barton, Wokingham; Robert Billing, Crowthorne, both of Great Britain

[73] Assignee: Questech Limited, United Kingdom

[21] Appl. No.: 148,609

[22] Filed: Jan. 26, 1988

[51] Int. Cl.$^4$ ............................................. H04N 5/14
[52] U.S. Cl. ..................................... 358/160; 358/22
[58] Field of Search ................... 358/160, 22; 382/44, 382/41, 47; 340/750

[56] References Cited

U.S. PATENT DOCUMENTS 4,437,121  3/1984  Taylor et al. ...................... 358/160

FOREIGN PATENT DOCUMENTS 2164767  3/1986  United Kingdom ................ 358/160

Primary Examiner—James J. Groody
Assistant Examiner—David E. Harvey
Attorney, Agent, or Firm—Berman, Aisenberg & Platt

[57] ABSTRACT

A storage and interpolation device for digital television pictures having a memory organized in 'tiles' of memory elements (2). Sub-assemblies of tiles (2A, 2B, 2C, 2D) all have the same coordinate address in one coordinate direction and have outputs coupled to an interpolation filter (6) operative in that direction. Individual tiles (2A; 2B; 2C; 2D) of respective sub-assemblies (1A, 1B, 1C, 1D) all have the same coordinate address in the other coordinate direction and the outputs of the filters (6) of the sub-assemblies are connected to inputs of a further filter (9) operative in the other coordinate direction. By allocating pixel values of discrete image areas of the picture to respective sub-assemblies (1A, 1B, 1C, 1D) in the horizontal direction and to groups of tiles (2A, 2B, 2C, 2D) in the vertical direction, interpolation can be effected by addressing all tiles simultaneously to produce a corresponding output from the filter 9.

2 Claims, 2 Drawing Sheets

|   |   |   |   |   |   |   |   |   |   |   |
|---|---|---|---|---|---|---|---|---|---|---|
|   |   |   |   |   |   |   |   |   |   |   |
|   |   | 2 | 1 | 8 | 7 | 6 | 5 | 4 | 3 |   |
|   |   | 10 | 9 | 16 | 15 | 14 | 13 | 12 | 11 |   |
|   |   | 18 | 17 | 24 | 23 | 22 | 21 | 20 | 19 |   |
|   |   | 26 | 25 | 32 | 31 | 30 | 29 | 28 | 27 |   |
|   |   |   |   | 8 | 7 | 6 |   |   |   |   |
| 25 | 26 | 27 |   |   |   |   |   |   |   |   |
| 1 | 2 | 3 | 4 | 5 | 6 | 7 | 8 |   |   |   |
| 9 | 10 | 11 | 12 | 13 | 14 | 15 | 16 |   |   |   |
| 17 | 18 | 19 | 20 | 21 | 22 | 23 | 24 |   |   |   |
| 25 | 26 | 27 | 28 | 29 | 30 | 31 | 32 |   |   |   |
| 8 |   |   |   |   |   |   | 8 |   |   |   |

← A

FIG. 1

PROCESSING OF VIDEO IMAGE SIGNALS

This Application is related to applications identified by attorneys references Nos. GQ1, (Ser. No. 148,611 filed Jan. 26, 1988), GQ3 (Ser No. 148,610 filed Jan. 26, 1988) and GQ4 (Ser. No. 148,612 filed Jan. 26, 1988), the disclosures of which are incorporated herein by reference.

BACKGROUND OF THE INVENTION

This invention concerns improvements in the processing of video image signals to achieve so-called digital video effects.

In such processing, each field or frame of a television image is stored as a series of discrete digital values or pixels containing the luminance or chrominance information of the original signal and obtained by sampling the original signal at an appropriate pixel repetition rate. The original signal may be reproduced by scanning the store, or, by addressing the store in apropriately timed relation to synchronising signals defining the television raster, selected image information can be retrieved from the store and displayed on a television screen in any desired position or orientation. Such retrieved information may be combined with other image information to produce a pattern or collage of discrete images, and by moving the boundaries between respective patterns containing the separate picture information, various effects can be achieved.

When image information from a frame or field of a digitally stored television picture is to be retrieved and reproduced as part of another frame or field of a television picture, with the original picture information being displaced in position and/or orientation, and possibly being reproduced at a different scale from the original image, it is not sufficient to address the store containing the original image with addresses that will simply provide an output signal corresponding to an originally sampled pixel. This is because image information is required at a higher resolution than the pixel repetition rate and thus it is necessary in order to obtain image information relating to points between adjacent pixels, to address the store in order to obtain the individual values relating to a group of adjacent pixels, in an image area including the coordinate position in respect of which image information is desired, and to process the respective values in order to interpolate the corresponding value at the appropriate coordinate position. In known video image processors, devices for performing this operation are referred to as interpolator and may comprise an arrangement of so-called finite impulse response filters, the coefficients of which may be varied by appropriate addressing signals, in order to provide the required output information. In addition, when an original image area is to be reproduced on a smaller scale, or compressed, it is necessary to apply to the filter a so-called compression signal, in order to introduce a bandwidth limitation for the purpose of preventing aliasing errors.

Known systems for the storage and interpolation of digital picture images are relatively complicated and have the disadvantages of high manufacturing cost in relation to the quality of the final picture.

SUMMARY OF THE INVENTION

It is an object of the present invention to provide an improved store and interpolator system for a digital video image processor, and in particular to provide such a system which is of simplified construction and which accordingly involves reduced manufacturing and maintenance costs.

In accordance with one aspect of the invention there is provided a device for the storage and retrieval of a video image signal in digital form, comprising means for deriving in respect of a picture or picture area represented in a field or frame of a video image signal, a set of values of image information capable of being arrayed in row and column form whereby coordinates of the array define the corresponding coordinate position within said picture or picture area of the image information represented by each value of said set; a plurality of separate memory devices each providing a storage means for corresponding sub-set of a said set of values and capable of being addressed by the coordinates of a corresponding row and column array defining said subset; and means for allocating a said set of said sampled values to said separate memory devices in such a manner that the sub-set of values contained in each memory device comprises a value from the same coordinate position in each of a plurality of separate notional areas which together make up the picture area corresponding to said set of values, all of the values relating to each notional area thereby being contained in separate ones of said memory devices, whereby the values relating to image information in a window of the shape and size of a said notional area and located in any given position in said picture or picture area can be derived simultaneously by addressing collectively the said plurality of separate memory devices.

Thus, in a device in accordance with the invention, the window area capable of being defined by values from the outputs of the plurality of separate memory devices may comprise that window area in respect of which corresponding pixel values are to be passed to an interpolator for the purpose of deriving image information within said window area to a finer resolution than is provided by the individually stored values.

In the process of interpolation by passing the values corresponding to such a window through a finite impulse response filter as referred to above, the individual values are arranged in groups such that the values in each group have the same address in the window in one coordinate direction, and each group of values is applied to a separate filter in order to obtain an output signal interpolated in the relevant coordinate direction, the output signals from the respective filters then being applied to a further impulse response filter, for the purpose of interpolation in the other coordinate direction.

Conveniently, therefore, the said memory devices may likewise be arranged in sub-assemblies, each subassembly containing a group of memory devices to which are allocated those sub-sets of values having the same position, in a corresponding coordinate direction, in each of said notional areas. The outputs of each of the memory devices in the sub-assembly may then be connected directly to respective inputs of a corresponding filter for performing the interpolation in the respective coordinate direction, and the outputs of all of the filters of the respective sub-assemblies may be connected to the inputs of a further filter for performing interpolation in the second coordinate direction. Such an arrangement has the considerable advantage that each of the separate sub-assemblies may be identical and interchangeable, thereby considerably reducing manufacturing costs.

BRIEF DESCRIPTION OF THE DRAWINGS

The invention is illustrated by way of example in the accompanying drawings, in which;

FIG. 1 is a diagram illustrating the organisation of a set of digital values corresponding to image information from an area in a frame of a television picture.

DETAILED DESCRIPTION OF PREFERRED EMBODIMENT

Figure 2:
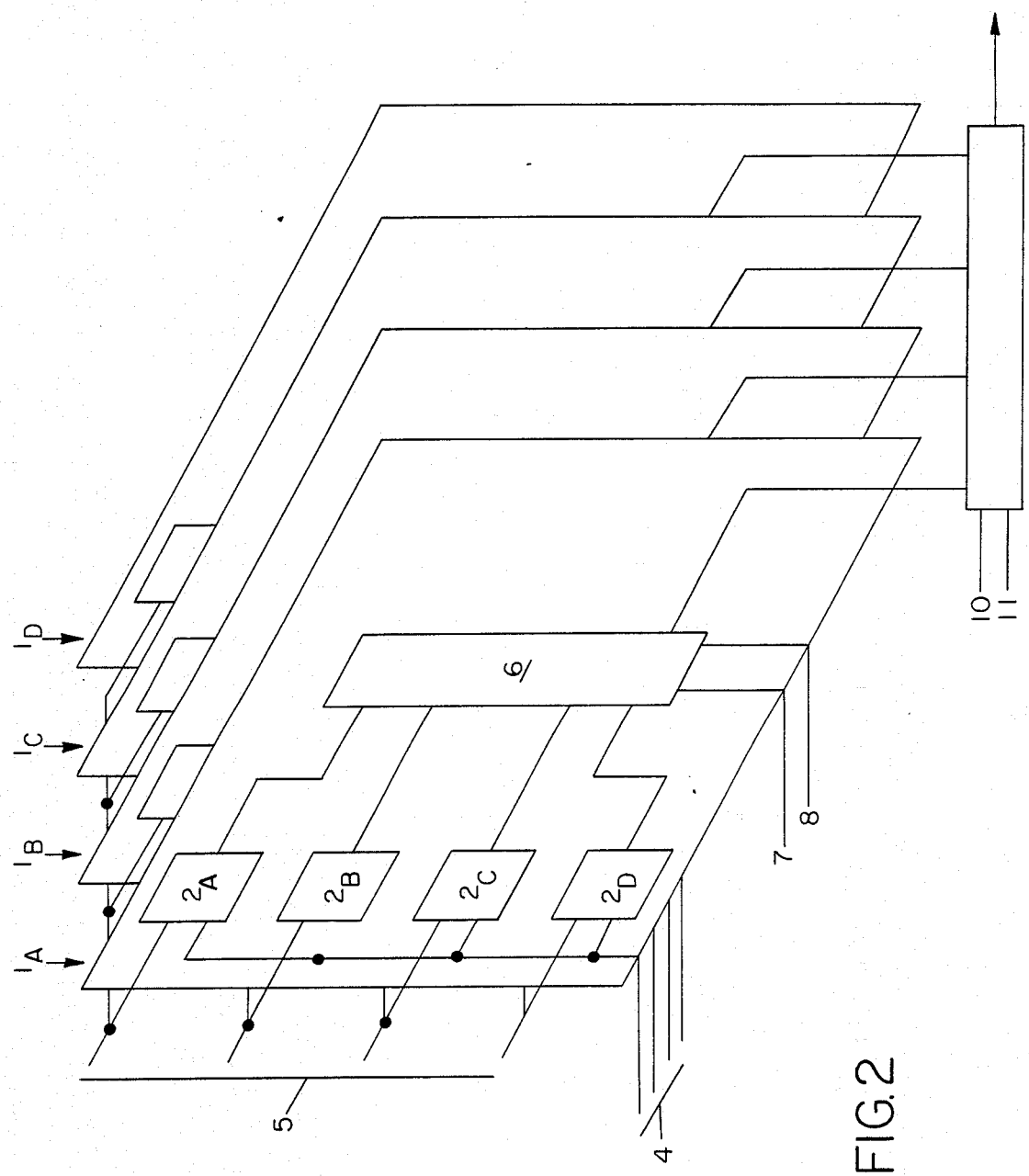
FIG. 2 is a diagrammatic perspective view of a storage and interpolation system in accordance with the invention.

In a system in accordance with the invention the store for a digital video picture image is organised in a way that depends on the sampling system used to convert the picture to digital form. The detailed description that follows is for the sampling system described in the European Broadcasting Union specification 601, sometimes known as the 4:2:2 standard. The system is however equally applicable to other sampling standards with suitable modification of the store organisation.

Each field of the picture is scanned as a series of lines and each line is sampled as a series of pixels, the samples being converted into digital form. The Luminance or Y signal is sampled on every pixel, the chrominance or U and V signals are sampled together on alternate pixels.

Separate stores are used for the Y, U and V signals, and each store is organised into a series of memory areas hereinafter referred to as tiles, each comprising one or more memory devices. The way in which pixels are assigned to tiles is as follows. As shown in FIG. 1, the pixels corresponding to a given signal are identified as an array of squares located in rows and columns, such that each row corresponds to a line of the video image field. The pixels in each line are divided into sections and the lines are arranged in groups. The sizes of the sections and groups are typically but not necessarily four lines to a group and eight Y or four U or V pixels to a section. Thus, in FIG. 1, an array of pixels corresponding to a Y-signal is organised into areas, one of which is indicated at A, each defined by one group of lines within a picture, and one section of pixels. Each area thus contains pixels identified, for the purpose of illustration, as numbers 1 to 32, and is bounded by identical areas the pixels of which are correspondingly identified, all the separate and adjoining areas together making up the relevant picture area in respect of which image information is to be stored. Within each area defined by one group and section each pixel is assigned to one tile of the store, each tile containing every pixel that has that particular position within an area. Thus, all of the pixels having the position indicated at 1 in the separate areas defining the complete picture image will be located in a corresponding tile, and the total memory store required to contain the Y-signal information derived from a field of the video picture will be organised into a total of 32 tiles.

During one particular field time, data are written to the store, and during a subsequent field the same data are read out again. By taking advantage of the store organisation described above, it is possible to read data from all the tiles simultaneously and hence obtain all the pixels in a window of one section by one group placed anywhere in the store. It will be appreciated that the section and group defining such a window need not be the same as those defining the individual areas, such as indicated at A in FIG. 1, since by correspondingly addressing the individual tiles a window of information can be made up from pixels in adjoining areas.

Referring to FIG. 2, there is shown diagrammatically a view of one embodiment of storage and interpolation system in accordance with the invention. The system comprises a plurality of sub-assemblies 1A, 1B, 1C, 1D, the number of which corresponds to the number of pixels in a section defining an area A as described above with reference to FIG. 1. Thus, in FIG. 2, only four such sub-assemblies are shown as would be the case for the storage of a U or V chrominance signal. Each subassembly comprises a plurality of storage tiles 2A, 2B, 2C, 2D, the number of tiles corresponding to the number of lines in a group defining an area A of FIG. 1. For the purpose of storage and retrieval of pixel values, each tile 2A to 2D is capable of being addressed by coordinate signals applied at inputs 4 and 5 to identify the coordinates in the vertical and horizontal directions respectively of that area A of FIG. 1 in which is located the pixel the value of which is to be stored or retrieved.

It will be appreciated that the storage and retrieval of these pixel values in memory devices forming the individual tiles will involve the application of control signals to appropriate data input and read/write control buses. For clarity, however, these are omitted from FIG. 2 as they will be well-known to one skilled in the art, and only the addressing inputs and data outputs are indicated diagrammatically in the drawing. The logic circuitry by which individual pixel values from a digital picture, such as is shown diagrammatically in FIG. 1; are transferred to the individual tiles of the memory will also be apparent to one skilled in the art and is not shown in detail. Suffice it to be said that coordinate addressing signals may be applied at the inputs 4 and 5 in timed relationship to the transmission of pixel values of the digital video signal to a common data input bus in such a manner that the image information is distributed within the tiles in the manner already described with reference to FIG. 1.

Each sub-assembly 1A, 1B, 1C, 1D also includes a finite impulse response filter 6, inputs of which are coupled to the respective outputs of the tiles 2A, 2B, 2C, 2D. In addition to these signal inputs, the filter includes, in known manner, an addressing input 7 and a control input 8 by means of which a control factor can be applied in accordance with the degree of picture compression. The outputs of all of the filters 6 of the respective subassemblies are connected to the inputs of a further finite impulse response filter 9, the latter having addressing and compression control inputs 10 and 11, in like manner to the filters 6.

The operation of the system described above is as follows. In order to derive an interpolated pixel value from the store provided by the system, the following control signals are applied, as will be understood by one skilled in the art:

1. The horizontal address of the required output pixel.
2. The vertical address of the required output pixel.
3. The degree of compression in the horizontal direction.
4. The degree of compression in the vertical direction.

The two addresses are presented to a much finer resolution that the pixel address of the store, typically one sixteenth of a pixel. The high order bits are used to address the tiles 2A–2D via inputs 4 and 5 in such a way that the pixels read from the tiles make up a window symmetically placed about the required output pixel as described above. The low order address bits and the degrees of compression are then used to select the coefficients of the filters 6 and 9 which combine the pixels read from the store in order to produce the output signal. The vertical address bits are applied to the inputs 7 of filters 6, and the horizontal address bits are applied to the input 10 of filter 9. The vertical compression signal is applied to the inputs 8 of filters 6 whilst the horizontal compression signal is applied to the input 11 of filter 9.

Thus, firstly the outputs from all tiles in the same column are combined and then the resulting values are combined horizontally to produce a final value. Note that for the sampling system described this means that the action of the first section is the same for Y, U and V signals and that as a result; it is possible to include the first section of the filter in the same sub-assembly as the tiles which feed it with data, this sub-assembly being identical for each position in each of the Y, U and V paths, one sub-assembly per pixel in the line section being required. For the numbers described this requires sixteen identical sub-assemblies.

The coefficients of the filter are in general a function of the form $$a \times \mathrm{Sin}\,(X)/X$$

where X is a function of the required degree of compression and the position in the window, and a is an arbitrary windowing function. If the arbitrary constants in the functions are chosen carefully, it is possible to achieve the objective of having a set of filter coefficients which consist of a single, near-central unity value which are automatically selected when the output picture is at full size, erect and centred. This ensures that the output signal is identical to the input signal if the picture is in this position.

What is claimed is:

1. A device for the storage and retrieval of a video image signal in digital form, said signal comprising a set of values of image information that, when arrayed in row and column form, define coordinates of a array and the corresponding coordinate positions within a picture or picture area represented by said set, a plurality of separate memory devices and means for storing said set of values in said separate memory devices such that a sub-set of values is contained in each memory device comprising values representing the same coordinate position in each of a plurality of separate notional areas which together make up the picture, or picture area, all of the values relating to each notional area thereby being contained in separate ones of said memory devices, whereby values relating to image information in a window of the shape and size of a notional area and located in any given position in said picture or picture area can be retrieved simultaneously by means for collectively addressing said plurality of separate memory devices, said memory devices being arranged in sub-assemblies each of which contains a group of said memory devices arranged to retrieve values which, in one coordinate direction, have the same position in each said notional area, addressing inputs of each group corresponding to said one coordinate direction being connected in common, and addressing inputs of respective memory devices of the groups corresponding to the other coordinate direction being connected in common, each sub-assembly further including means for performing interpolation of retrieved values in said one coordinate direction, data outputs of each said group of memory devices being connected to corresponding inputs of the respective interpolating means, and said device comprising a further means for performing interpolation in the other coordinate direction and having inputs to which are connected outputs of the respective interpolating means of said subassemblies, whereby interpolation of image information in respect of any selected point within said picture or picture area can be obtained by applying simultaneously coordinate addressing signals to the addressing inputs of said memory devices and control signals to said respective interpolating means.

2. A device according to claim 1, wherein each said respective interpolating means comprises a finite impulse response filter having control inputs enabling selection of both a coordinate position of a picture point to be interpolated and a degree of compression to be achieved in the final picture image to be produced by the device.

* * * * *